US009310041B2

United States Patent
Pfeil

(10) Patent No.: US 9,310,041 B2
(45) Date of Patent: Apr. 12, 2016

(54) ILLUMINATION DEVICE FOR PRODUCING A LIGHT STRIP AND MOTOR VEHICLE

(75) Inventor: Marcus Pfeil, Winkelhaid (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 13/600,914

(22) Filed: Aug. 31, 2012

(65) Prior Publication Data

US 2013/0229815 A1    Sep. 5, 2013

(30) Foreign Application Priority Data

Sep. 2, 2011 (DE) .......................... 10 2011 112 321

(51) Int. Cl.
| | |
|---|---|
| B60Q 3/00 | (2006.01) |
| F21S 8/10 | (2006.01) |
| B60Q 3/02 | (2006.01) |
| F21V 8/00 | (2006.01) |
| F21V 21/00 | (2006.01) |

(52) U.S. Cl.
CPC .................. *F21S 48/00* (2013.01); *B60Q 3/004* (2013.01); *B60Q 3/0213* (2013.01); *B60Q 3/0289* (2013.01); *F21S 48/2206* (2013.01); *F21S 48/2212* (2013.01); *F21S 48/2237* (2013.01); *F21S 48/2268* (2013.01); *F21V 21/00* (2013.01); *G02B 6/001* (2013.01)

(58) Field of Classification Search
CPC . F21V 21/00; F21V 2200/00; F21V 2200/10; F21V 2200/13; F21V 2200/15; F21S 48/00; F21S 48/2268; F21S 48/2206; F21S 48/2212; F21S 48/2237; G02B 6/001; G02B 6/0075; G02B 6/0218; G02B 6/02176; B60Q 3/004; B60Q 3/0213; B60Q 3/0289; B60Q 1/56; B60Q 1/2665; B60Q 3/023; F21W 2131/302
USPC .............. 362/493, 490, 488, 23.09, 551, 616, 362/511, 23.16, 23.01, 23.07, 23.1, 23.17, 362/555, 459, 487, 800
See application file for complete search history.

(56) References Cited

U.S. PATENT DOCUMENTS

| 5,857,758 A | 1/1999 | Dealey, Jr. et al. |
|---|---|---|
| 6,402,354 B1 | 6/2002 | Tatewaki et al. |
| 7,307,395 B2 | 12/2007 | Bouamra et al. |
| 7,708,441 B2 | 5/2010 | Luecke et al. |
| 2003/0006230 A1* | 1/2003 | Kaji et al. ..................... 219/620 |
| 2003/0026106 A1 | 2/2003 | Knaack et al. |

(Continued)

FOREIGN PATENT DOCUMENTS

| CN | 201659928 | 12/2010 |
|---|---|---|
| DE | 94 22 405 U1 | 8/2001 |

(Continued)

*Primary Examiner* — Sean Gramling
*Assistant Examiner* — Naomi M Wolford
(74) *Attorney, Agent, or Firm* — Henry M. Feiereisen LLC

(57) ABSTRACT

An illumination device for producing a light strip along a predetermined distance includes light sources and light conductors, wherein light of a first one of the light sources is distributable along a first section of the distance by a first one of the light conductors up to an end region of the first light conductor, wherein light of a second one of the light sources is distributable along a second section of the distance by a second one of the light conductors up to an end region of the second light conductor, and wherein the end region of the first light conductor and the end region of the second light conductor are arranged adjacent one another along the distance.

11 Claims, 2 Drawing Sheets

(56) References Cited

U.S. PATENT DOCUMENTS

| | | |
|---|---|---|
| 2010/0214795 A1 | 8/2010 | Salter et al. |
| 2011/0013411 A1* | 1/2011 | Sakiyama et al. ............ 362/494 |
| 2011/0128755 A1* | 6/2011 | Ludwig et al. ................ 362/555 |

FOREIGN PATENT DOCUMENTS

| | | |
|---|---|---|
| DE | 101 39 578 A1 | 4/2003 |
| DE | 103 41 884 B4 | 4/2005 |
| DE | 699 17 485 T2 | 5/2005 |
| DE | 10 2004 052 893 | 5/2006 |
| DE | 10 2008 008 180 A1 | 8/2009 |
| DE | 10 2008 015 561 A1 | 8/2009 |
| DE | 10 2009 039 556 A1 | 3/2010 |
| DE | 102008060353 | 6/2010 |
| DE | 102009038483 | 2/2011 |
| EP | 190 33 59 A2 | 3/2008 |
| JP | 2008-068787 | 3/2008 |

* cited by examiner

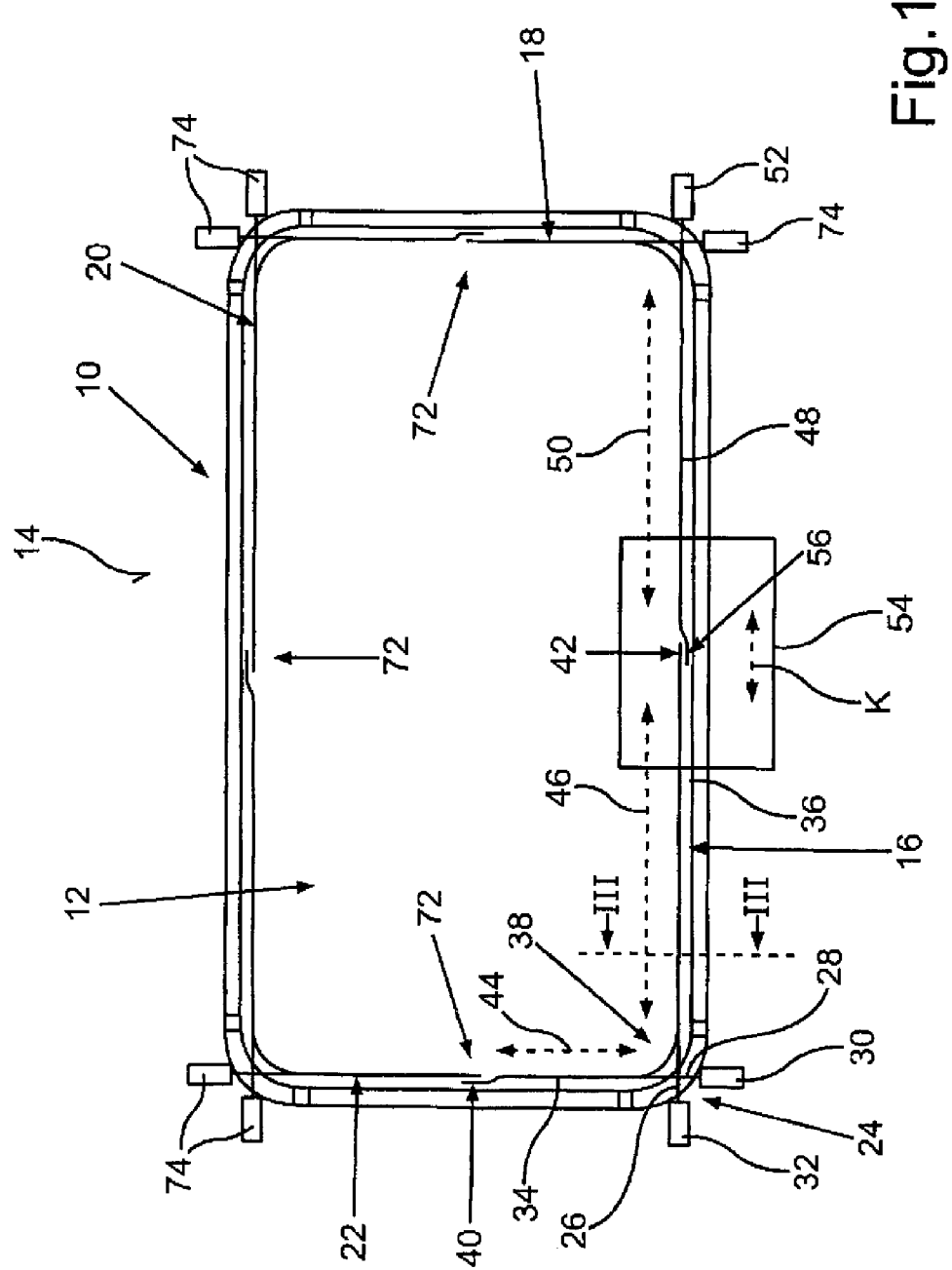

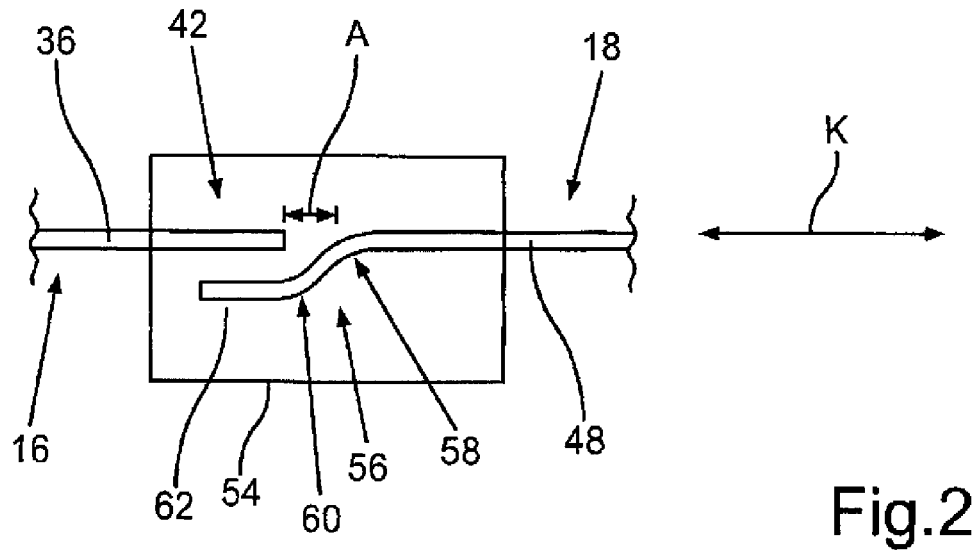
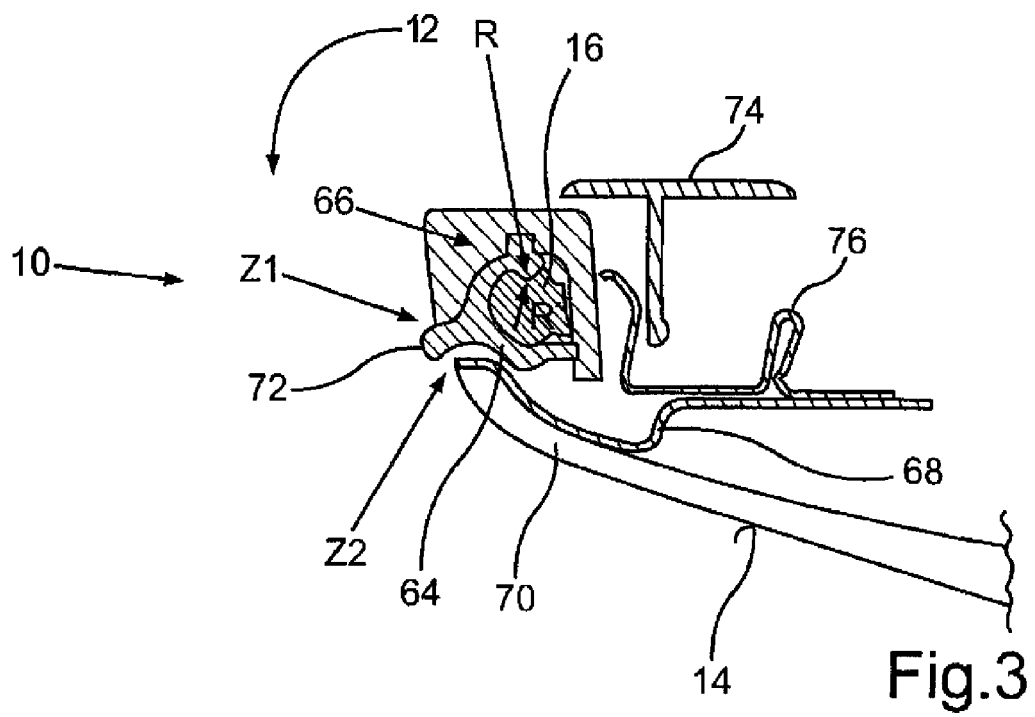

ILLUMINATION DEVICE FOR PRODUCING A LIGHT STRIP AND MOTOR VEHICLE

CROSS-REFERENCES TO RELATED APPLICATIONS

This application claims the priority of German Patent Application, Serial No. 10 2011 112 321.4, filed Sep. 2, 2011, pursuant to 35 U.S.C. 119(a)-(d), the disclosure of which is incorporated herein by reference.

BACKGROUND OF THE INVENTION

The present invention relates to an illumination device for generating a light strip along a predetermined distance on a component The following discussion of related art is provided to assist the reader in understanding the advantages of the invention, and is not to be construed as an admission that this related art is prior art to this invention.

In order to allow a person to orient themselves also inside the motor vehicle in darkness individual components for example a cup holder or a loudspeaker can be illuminated from their interior with a light source. The person can then recognize where the functional element is located in the interior without the entire interior having to be illuminated. The above mentioned illumination device allows to distribute the light of a light source along a contour of the respective functional element so that the contour is recognizable in the dark as bright strip. Typically such an illumination device is used for a circumferential illumination, i.e. in this case the strip has the shape of a closed band.

In order to generate a circumferential light strip, a ring shaped light conductor made of Polymethylmethacrylate (PMMA, Plexiglas) can be used into which light is coupled on both ends. The light conductor has the shape of the contour to be represented and can for example by means of a latching engagement be fixed on the component or about the component. The light emitting diodes can each be mounted in an element for coupling-in which an electric switch is located for operating the light emitting diode and by which light of the light emitting diode is focused and directed onto a coupling surface of the light conductor.

Along its longitudinal extension in the direction of extension of the contour, the light conductor has scattering centers i.e., for example indents on its outer walling or reflecting particles in its inside by which a portion of the light is respectively deflected and exits the light conductor. By this, the light of the light diodes is distributed along the distance, thereby causing the light conductor to appear evenly bright along the contour. By means of such light conductors a surface of up to 200 mm×150 mm can typically be surrounded by an evenly bright sight strip.

When a larger area is to be surrounded with a circumferential light strip, the light strip has to have an according length. This poses the problem that thermally caused changes in length of the light conductor can cause mechanical tensions in its material which can lead to hairline cracks in the material or even destruction of the light conductor. In particular, in a motor vehicle temperatures of between −40° C. to 80° C. can occur.

It would therefore be desirable and advantageous to provide an improved illumination device by means of which an evenly bright light strip can be produced along the contour of a large-surface-area functional element.

SUMMARY OF THE INVENTION

The illumination device according to the invention allows producing a light strip along a predetermined distance. For this, light is distributed along different sections of this distance by a respective light conductor. Two of these light conductors cross over at their ends along a course of the distance.

According to one aspect of the present invention an illumination device for producing a light strip along a predetermined distance, includes first and second light sources, and first and second light conductors, wherein light of the first light source is distributable along a first section of the distance by the first light conductor up to an end region of the first light conductor, wherein light of the second light source is distributable along a second section of the distance by the second light conductor up to an end region of the second light conductor, and wherein the end region of the first light conductor and the end region of the second light conductor are arranged adjacent one another along the distance. The illumination device according to the invention has the advantage that a continuous light strip can also be produced along a relatively long distance, i.e. an edge of a dash board or on an encasing for a sunroof. A continuous light strip means a strip-shaped region of a surface which is evenly brightly illuminated from inside along the distance. An evenly bright light strip means that differences of brightness values of the light strip along the distance are so small that the differences in brightness are imperceptible for a person.

Arranging the two light conductors offset to one another instead of arranging them to abut one another with respective front sides, avoids that the two light conductors exert mechanical pressure on each other when they expand as a result of high temperature. This also avoids that the light strip is interrupted in case of contraction of the light conductors at very low temperature so that their respective overall length is smaller than at room temperature. Another advantage is that the two light conductors can be manufactured with greater tolerances with regard to their longitudinal dimensions, thus allowing decreasing manufacturing costs for the illumination device.

According to another advantageous feature of the invention, the two end regions of the light conductors can be supported for movement relative to one another in a direction of extension of the distance. This avoids that a mechanical stress along the distance in the respective light conductors exceeds a predetermined value in case of a thermally caused change in length.

According to another advantageous feature of the invention, the light of the two light sources is guidable in the light conductors in opposite directions of extension of the distance. In other words, the end regions of the light conductors which are arranged adjacent one another are located between the two light sources in a region which is relatively far from the two light sources. While this may cause the amount of emitted light to be smaller in the end region of the individual light conductors compared to a region which is close to the respective light source, the adjacently arranged end regions of the two light conductors together also allow to achieve the same brightness in the end regions as in the remaining sections of the distance by overlapping of the light that is emitted in the two end regions.

According to another advantageous feature of the invention both light conductors are arranged in an at least partially transparent receiving device which extends along the two sections. This allows a relative movement of the light conductors with regard to the receiving device. The walls of the light conductors can also slide along the inner walling of the receiving device in the direction of extension of the distance. The receiving device allows providing a closed surface which extends along the distance i.e. along a contour and is evenly brightly illuminated from the inside. The receiving device can be made of a material which has a smaller coefficient of thermal extension compared to the material of which the light conductors are made. This allows ensuring that gap sizes between the receiving device and surrounding components do not exceed a predetermined threshold value. The smaller light conductivity of the material which is oftentimes associated with a smaller coefficient of thermal extension does not play a significant role here because the light conduction from the light sources to the individual light-exiting site occurs mostly via the light conductors. The latter can expand freely due to the described support.

In order to be able to arrange the light conductors adjacent one another in a simple manner one of the light conductors preferably has an offset end region. In this way the two end regions can be arranged behind one another relative to a viewing direction from which an observer views the light strip. This results in an evenly broad light strip. For this purpose the two light conductors can also be inserted into one another in their end regions.

According to another advantageous feature of the invention at least the first light conductor is configured L-shaped. A coupling-in region for the light of the first light source into the first light conductor is arranged in the bend of the L-shape. This embodiment has the advantage that an evenly bright light strip can be generated for a rectangular contour. Preferably both light conductors are configured L-shape as described. The arrangement of the coupling-in region in the bend of the L-shape has the advantage that the light strip does not appear brighter in the coupling-in region.

In another embodiment, more than one light source is used in at least the first light conductor. The light of the further light sources can be distributed along a third section of the distance by means of the first light conductor up to a further end region of the first light conductor. This allows the light conductor to have a strongly curved or bent region which still appears evenly bright. The sections of the distance which can be illuminated by means of the first light conductor are preferably straight while the light sources are arranged in the curved or bent region.

According to another aspect of the present invention a motor vehicle has at least one illumination device which corresponds to an embodiment of the illumination device according to the invention. This motor vehicle has the advantage that contours of large functional elements for example a control panel of a dash board, an access opening for a clove compartment or a handle for a door, can also be made recognizable in the dark by means of an evenly bright light strip. The at least one illumination device can be exposed to great temperature fluctuations without damage to the light conductors, or without a gap forming between the illumination device and a component by which the illumination device is encased due to deformation of the illumination device.

In particular, in the motor vehicle according to the invention a closable opening can be surrounded by the at least one illumination device. For example, a door frame can be illuminated which allows a passenger avoiding bumping her head when entering or exiting. Preferably the at least one illumination device is arranged in a frame of a sunroof.

In the motor vehicle according to the invention, an evenly bright illumination can be provided along an angular contour in a particularly simple manner, in that the light sources of the at least one illumination device are arranged in a respective corner region of the distance to be illuminated and the end regions are arranged in a straight section of the distance. This has the advantage that the light sources and the coupling-in regions of the light conductors can be arranged fixed in the motor vehicle which allows a particularly simple design of the at least one illumination device.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows a schematic representation of an illumination device for a sunroof of a motor vehicle which represents an embodiment of the motor vehicle according to the invention;

FIG. 2 shows an enlarged section from the representation of FIG. 1; and

FIG. 3 shows a schematic representation of a cross section of one of the illumination devices of FIG. 1.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a frame 10 which surrounds a roof opening 12 in a roof of a (not further shown) motor vehicle. The roof opening 12 can be closed by a sunroof (not shown). FIG. 1 shows the frame 10 from the inside of the motor vehicle in viewing direction upwards, which means in the vertical direction of the motor vehicle. The frame 10 is surrounded by a roof liner 14. A bright strip extends along a surface of the frame 10 which allows a person located in the motor vehicle to recognize a contour of the roof opening 12 in the dark. The light strip surrounds the roof opening 12 completely and its brightness along its extension varies to such a small degree that a person is not able to recognize this variation.

In order to produce the light strip, four light conductors 16, 18, 20, 22 are located inside the frame 10. The light conductors 16 to 18 are each configured L-shaped. The Light conductors 16 to 18 have the same construction. For reasons of simplicity only the light conductor 16 is described in the following.

The light conductor 16 has two coupling-in regions 26, 28 in a corner of its L-shape, each of which coupling region 26, 28 is inserted into a coupling-in element 30, 32. Each of the coupling-in elements 30, 32 has illumination means in its interior whose light enters the light conductor 16 in the coupling-in region 26 or 28. The coupling-in regions can for example each have one or multiple light emitting diodes as illumination means. The light generated in the coupling-in element 30 propagates in the light conductor 16 predominantly along a leg 34 of the L-shape and the light of the coupling element 32 correspondingly along a leg 36 of the L-shape. In a curved region 38 of the light conductor 16, the light of both coupling-in elements 30, 32 overlaps.

Along the legs 34, 36 and in the curved region 38, portions of the light exit from the light conductor 16 and enter the inner space of the motor vehicle. The scattering centers are configured so that the amount of light exiting per section of the distance along the leg 34 and 36 until a respective end region 40, 42 of the legs 34 or 36 is almost the same. As a result, leg 34 illuminates a section 44 of the contour of the roof opening 12 and leg 36 illuminates a section 46 of the contour.

Leg 48 of the light conductor 18 illuminates a further section 50 of the contour with light which is generated in a coupling-in element 52. The end region 42 of the leg 36 and the end region 56 of the leg 48 overlap along a direction of extension K of the contour in a transition region 54. For better illustration the transition region 54 is shown again enlarged in FIG. 2. Although the end region 42 represents the portion of the leg 36 which is farthest away from the coupling-in element 32 and correspondingly the end region 56 also represents the portion of the leg 48 which is farthest away from the coupling-in element 52, a person does not perceive a difference in brightness of the light strip in the end regions 46, 50 on one hand, and in the transition region 54 on the other hand. As a result of the overlap of the end regions 42 and 56, the light exiting from these end regions is superimposed which results in an overall brightness of the light strip in the transition region 54 which corresponds to the brightness of the light strip in the sections 46 and 50.

The end regions 42 and 56 overlap so that they are spaced apart at a distance A in the direction of extension K. The distance A can for example be 20 mm at a temperature of 20° C.

When the legs 36 and 48 are heated to a temperature above 20 C the distance A is reduced. At a temperature of the legs 36 and 48 below 20° C. the distance A is correspondingly greater.

The legs 36 and 48 are arranged coaxial relative to one another. The overlap of the end regions 42 and 56, i.e. the arrangement of the two end regions 42 and 56 adjacent one another is enabled by bent shape of the end region 56. The end region 56 has two curvatures 58, 60 which result in an axially parallel offset between the leg 48 and an end piece 62. The end piece 62 is located in the direction of extension K adjacent the end piece 42.

In case of a change in length of the legs 34 and 36 of the light conductor 16 a position of the coupling-in regions 26 and 28 and the coupling-in elements 30 and 32 relative to the frame 10 remains constant. For this, the light conductor 16 is fixedly connected with the frame 10 in the region of its bend 24. The end regions 40 and 42 on the other hand are movable along the direction of extension of the contour.

This floating bearing of the legs 34 and 36 of the light conductor 16 in the frame 10 is explained in more detail by way of FIG. 3, which shows a sectional view of the frame 10 along a cut line indicated in FIG. 1. The light conductor 16 is supported in a transparent scatter body 64. The scatter body 64 has a rectangular basic shape which corresponds to the shape of the frame 10. The scatter body 64 surrounds the roof opening 12 completely. It can be built one-piece.

The light conductor 16 is held in the scatter body 64 by a snap connection which is enabled by a latching region R of the scatter body 64, which latching region R engages in a corresponding recess R' of the light conductor 16. As a result of the engagement of the latching region R in the recess R' and an overall irregular cross section of the leg 36, the leg 36 cannot rotate about its longitudinal axis relative to the scatter body 64. This causes the scatter centers to always remain oriented in the same position in the scatter body. Along the direction of extension K of the contour the leg is not fixed.

The scatter body 64 is mounted between a strip 66 of the frame 10 and a clamping element 68 of the frame 10. The strip 66 can be a crown strip which can be made for example of hard rubber or a metal alloy. The clamping element holds a decorative fabric 70 of the ceiling 14. The scatter body 64 can be connected with the strip 66 and with the clamping element 68 for example by a bonding connection. The clamping element 68 can be made for example of plastic or particle board.

A gap size Z1 between a projection 72 of the scatter body 64 via which light which enters the scattering body 64 from the light conductor, reaches the interior of the motor vehicle, and the strip 66 changes due to temperature only to a degree which is imperceptible by a user of the motor vehicle. The same applies to a gap size Z2 between the projection 72 and the clamping element 68. The small change of the gap sizes Z1 and Z2 results from a correspondingly small coefficient of thermal expansion of the material of which the scattering body 64 is made. In the example, the strip 66 is held by a connection element 74 by means of a clip connection on a metal plate of the roof 14. A clamp 76 fixes the strip 66 relative to the connection element 74.

The light conductor 16 which is supported in the scatter body 64 has a greater light conductivity than the scatter body 64. For this, the light conductor 16 is made of a corresponding material. The light conductor 16 can be made of Polymethylmethacrylate (PMMA) or a Polycarbonate (PC). The material of the light conductor 16 can have a greater thermal coefficient than the material of the scatter body 64. When the light conductor 16 changes its position due to a change of the room temperature, the leg 36 slides in the scatter body 64 along the direction of extension K.

Due to the similar construction, the above explanations apply also to the other light conductors 18, 20 and 22. In addition to the transition region 54, three further transition regions result from the four L-shaped light conductors 16 to 22. The transition regions 54, 72 are each arranged in a center of a straight edge of the rectangular contour of the roof opening 12. The end regions of the respective legs of the light conductors are also arranged pair wise adjacent one another in the direction of extension of the contour. In addition to the already mentioned coupling-in elements 30, 32 and 52, light is fed into the light conductors by further coupling elements 74.

The example shows how the invention enables a circumferential illumination of a large surface area component, here a sunroof, without visible interruption. Four light conductors are used which are illuminated cross-wise with light emitting diodes at the corners of the sunroof. The corners of the sunroof section in the ceiling form the fixed bearings of the light conductors. The floating bearings form the overlapping ends of the light conductors which allow compensation of tolerances. The light conductors are made of customary, light-conducting material and extend in a circumferential scatter body. The scatter body is held by a strip of the frame of the sunroof. The scatter body includes the surface which is visible for the persons in the interior of the motor vehicle and can thus be mechanically decoupled from the ceiling only to a limited degree because no division is possible. In the invention the material of the scattering body can be chosen so that it has a better thermal coefficient of expansion than the light conductor located inside the scattering body. When the light conductors expand due to the heat they can move along the scattering body. The coupling-in elements can also be supported floatingly.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An illumination device for generating a light strip along a predetermined distance, comprising:
   first and second light sources; and
   first and second light conductors, wherein the first light source is arranged at a first light entry point of the first light conductor and the second light source is arranged at a second light entry point of the second light conductor, said first light conductor conducting light of the first light source from the first light entry point of the first light conductor to a terminus of the first light conductor opposite the first light entry point along a first section of the predetermined distance, said second light conductor conducting light of the second light source from the second light entry point of the second light conductor to a terminus of the second light conductor opposite the second light entry point along a second section of the distance, wherein the terminus of the first light conductor and the terminus of the second light conductor cross over along a course of the predetermined distance, and wherein the first and the second section are each defined by an axis and are arranged coaxial to each other.

2. The illumination device of claim 1, wherein the terminus of the first light conductor and the terminus of the second light conductor are supported for movement relative to one another in a direction of extension of the predetermined distance.

3. The illumination device of claim 1, wherein the first light source and the second light source are arranged in relation to the first and second light conductors so that light emitted by the first and second light sources is guided in the first and second light conductors in opposite directions along the predetermined distance.

4. The illumination device of claim 1, further comprising an at least partially transparent receiving device extending along the first and second sections of the distance, wherein the first and second light conductors are arranged in the receiving device so as to be movable relative to the receiving device in a direction of extension of the predetermined distance.

5. The illumination device of claim 1, wherein one of the first and second light conductors has a bent shape in a region of the terminus of the first light conductor or in a region of the terminus of the second light conductor.

6. The illumination device of claim 1, wherein at least the first light conductor is configured in the shape of an L and having a coupling-in region arranged in a corner of the L for coupling the light of the first light source into the first light conductor.

7. The illumination device of claim 1, further comprising a further light source arranged in relation to the first light conductor so that light emitted by the first light source is conducted in the first light conductor along a third section of the predetermined distance up to another terminus of the first light conductor.

8. A motor vehicle, comprising:
   at least one illumination device for generating a light strip along a predetermined distance, said at least one illumination device comprising
   first and second light sources; and
   first and second light conductors, wherein the first light source is arranged at a first light entry point of the first light conductor and the second light source is arranged at a second light entry point of the second light conductor, said first light conductor conducting light of the first light source from the first light entry point of the first light conductor to a terminus of the first light conductor opposite the first light entry point along a first section of the predetermined distance, said second light conductor conducting light of the second light source from the second light entry point of the second light conductor to a terminus of the second light conductor opposite the second light entry point along a second section of the distance, and wherein the terminus of the first light conductor and the terminus of the second light conductor cross over along a course of the predetermined distance, and wherein the first and the second section are each defined by an axis and are arranged coaxial to each other.

9. The motor vehicle of claim 8, wherein a closable opening is surrounded by the at least one illumination device.

10. The motor vehicle of claim 8, further comprising a sunroof encased by an encasement, wherein the at least one illumination device is arranged in the encasement.

11. The motor vehicle of claim 8, wherein the at least one illumination device further comprises multiple of said first and second light sources and multiple of said first and second light conductors, wherein the multiple first and second light sources are arranged in respective corner regions of the distance and the end regions of the multiple first and second light conductors are arranged in a straight section of the distance.

* * * * *